United States Patent
Paul et al.

(10) Patent No.: US 11,544,564 B2
(45) Date of Patent: Jan. 3, 2023

(54) METHOD, DEVICE AND SYSTEM TO GENERATE A BAYESIAN INFERENCE WITH A SPIKING NEURAL NETWORK

(71) Applicant: Intel Corporation, Santa Clara, CA (US)

(72) Inventors: Arnab Paul, Hillsboro, OR (US); Narayan Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 304 days.

(21) Appl. No.: 16/957,056

(22) PCT Filed: Feb. 23, 2018

(86) PCT No.: PCT/US2018/019498
§ 371 (c)(1),
(2) Date: Jun. 22, 2020

(87) PCT Pub. No.: WO2019/164513
PCT Pub. Date: Aug. 29, 2019

(65) Prior Publication Data
US 2020/0342321 A1  Oct. 29, 2020

(51) Int. Cl.
*G06N 3/08* (2006.01)
*G06N 3/04* (2006.01)

(52) U.S. Cl.
CPC ............. *G06N 3/08* (2013.01); *G06N 3/049* (2013.01); *G06N 3/0472* (2013.01)

(58) Field of Classification Search
CPC .... G06N 3/0445; G06N 3/0472; G06N 3/049; G06N 3/0635; G06N 7/005; G06N 3/08;
(Continued)

(56) References Cited

U.S. PATENT DOCUMENTS 10,541,274 B2 * 1/2020 Yi ...................... G06N 3/0635
10,885,425 B2 * 1/2021 Imam .................. G06N 3/049
(Continued)

OTHER PUBLICATIONS

International Preliminary Report on Patentability from PCT/US2018/019498 dated Sep. 3, 2020, 6 pgs.
(Continued)

*Primary Examiner* — Huyen X Vo
(74) *Attorney, Agent, or Firm* — Essential Patents Group, LLP.

(57) ABSTRACT

Techniques and mechanisms for performing a Bayesian inference with a spiking neural network. In an embodiment, a parent node of the spiking neural network receives a first bias signal which is periodic. The parent node communicates a likelihood signal to a child node, wherein the parent node and the child node correspond to a first condition and a second condition, respectively. Based on a phase change which is applied to the first bias signal, the likelihood signal indicates a probability of the first condition. The child node also receives a signal which indicates an instance of the second condition. Based on the indication and a second bias signal, the child node signals to the first node that an adjustment is to be made to the phase change applied to the first bias signal. After the adjustment, the likelihood signal indicates an updated probability of the first condition.

20 Claims, 8 Drawing Sheets

(58) Field of Classification Search
CPC ....... G10L 13/027; A61F 9/08; G09B 21/007; G09B 21/00
USPC .......................................................... 706/21
See application file for complete search history.

(56) References Cited

U.S. PATENT DOCUMENTS

| | | | |
|---|---|---|---|
| 2011/0016068 A1 | 1/2011 | Lewi | |
| 2013/0103626 A1* | 4/2013 | Hunzinger | G06N 3/088 706/16 |
| 2015/0235124 A1 | 8/2015 | Rao | |
| 2015/0242745 A1* | 8/2015 | Wang | G06N 3/049 706/25 |
| 2018/0053085 A1* | 2/2018 | Matsumoto | G06N 3/0445 |
| 2018/0174041 A1* | 6/2018 | Imam | G06N 3/063 |
| 2018/0357557 A1* | 12/2018 | Williams | G06Q 30/0201 |
| 2020/0218977 A1* | 7/2020 | Paul | G06N 3/049 |
| 2020/0272884 A1* | 8/2020 | Paul | G06N 3/049 |
| 2020/0342321 A1* | 10/2020 | Paul | G06N 3/0472 |
| 2021/0042586 A1* | 2/2021 | Toyoshiba | G06F 17/18 |
| 2021/0090748 A1* | 3/2021 | Toyoshiba | G06F 40/30 |
| 2021/0313070 A1* | 10/2021 | Toyoshiba | A61B 5/4088 |

OTHER PUBLICATIONS

International Search Report and Written Opinion from PCT/US2018/019498 dated Nov. 16, 2018, 9 pgs.
Deneve, Sophie, "Bayesian inference in spiking neurons", NIPS' 04 Proceedings of the 17th International Conference of Neural Information Processing Systems, pp. 353-360, 2004. Retrieved from the Internet: <https://papers.nips.cc/papers/2716-bayesian-inference-in-spiking-neurons.pdf>.
Paulin, Michael G. et al., "Bayesian Inference with Spiking Neurons", arXiv.org: 1406.5115, pp. 1-17, Jun. 19, 2014. Retrieved from the Internet: <https://arxiv.org/ftp/arxiv/papers/1406/1406.5115.pdf>.
Steimer, Andreas, "Neurally Inspired Models of Belief-Propagation in Arbitrary Graphical Models", ETH Zurich Research Collection, pp. 1-156, 2012. Retrieved from the Internet: <https://www.researchcollection.ethz.ch/bitstream/handle/20.500.11850/153834/eth-6632-02.pdf>.
Extended European Search Report for European Patent Application No. 18907367.9, dated May 19, 2022.

* cited by examiner

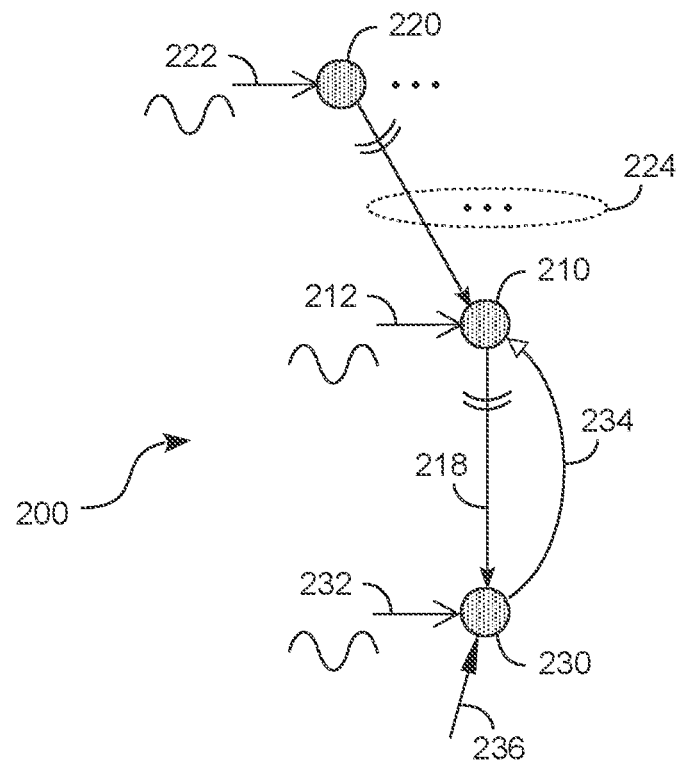
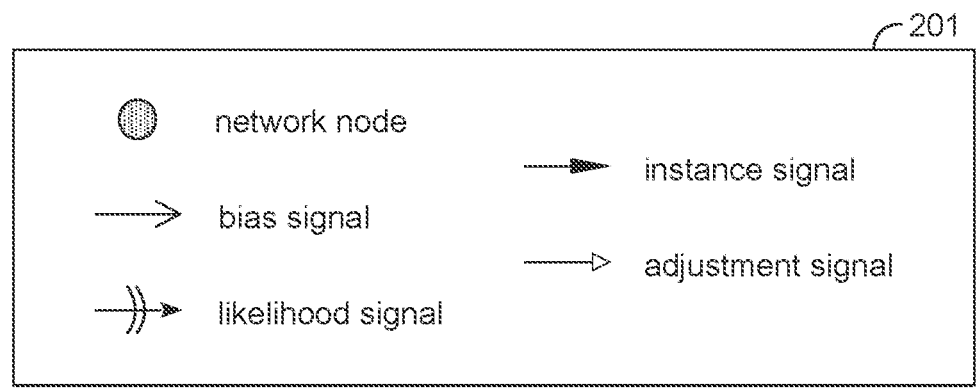
FIG. 2A

300

310
Receiving a first bias signal and a second bias signal, respectively, at a first node and a second node of a spiking neural network

320
Applying a change to a phase of the first bias signal

330
Communicating, from the first node to the second node, a third signal which indicates a likelihood of a first condition to which the first node corresponds

340
Receiving at the second node a signal which indicates an instance of a second condition to which the second node corresponds

350
In response to the instance of the second condition, communicating, from the second node to the first node, a fourth signal based on the second bias signal

360
Based on the fourth signal, adjusting an amount of the change to the phase of the first bias signal

FIG. 3

METHOD, DEVICE AND SYSTEM TO GENERATE A BAYESIAN INFERENCE WITH A SPIKING NEURAL NETWORK

CLAIM OF PRIORITY

This Application is a National Stage Entry of, and claims priority to, PCT Application No. PCT/US2018/019498, filed on Feb. 23, 2018 and titled "METHOD, DEVICE AND SYSTEM TO GENERATE A BAYESIAN INFERENCE WITH A SPIKING NEURAL NETWORK", which is incorporated by reference in its entirety for all purposes.

BACKGROUND

Embodiments described herein generally relate to spiking neural networks, and more particularly, but not exclusively, relate to technologies for performing a Bayesian inference operation with a spiking neural network.

Spiking neural networks (or "SNNs") are increasingly being adapted to provide next-generation solutions for various applications. SNNs variously rely on signaling techniques wherein information is communicated using a time-based relationship between signal spikes. As compared to typical deep-learning architectures—such as those provided with a convolutional neural network (CNN) or a recurrent neural network (RNN)—a SNN provides an economy of communication which, in turn, allows for orders of magnitude improvement in power efficiency.

While neural networks are generally efficient for applications such as image recognition, problems have been faced in trying to adapt such neural networks for higher order analytical reasoning such as Bayesian inference processing. Bayesian networks are straightforward in principle, but are practically difficult to implement due to an exponential relationship between the number of terms in a given problem and the circuitry and/or computational workload needed to solve that problem. To address these difficulties, existing techniques variously require auxiliary nodes, non-local computation or additional purpose-designed support circuitry. As the size, variety and proliferation of artificial intelligence networks continue to grow, there is expected to be an increasing premium placed on incremental improvements to solutions for providing higher order analysis.

BRIEF DESCRIPTION OF THE DRAWINGS

The various embodiments of the present invention are illustrated by way of example, and not by way of limitation, in the figures of the accompanying drawings and in which:

FIG. 2A is a functional block diagram illustrating elements of a spiking neural network according to an embodiment.

FIG. 3 is a flow diagram illustrating features of a method to operate a spiking neural network according to an embodiment.

DETAILED DESCRIPTION

Figure 1:
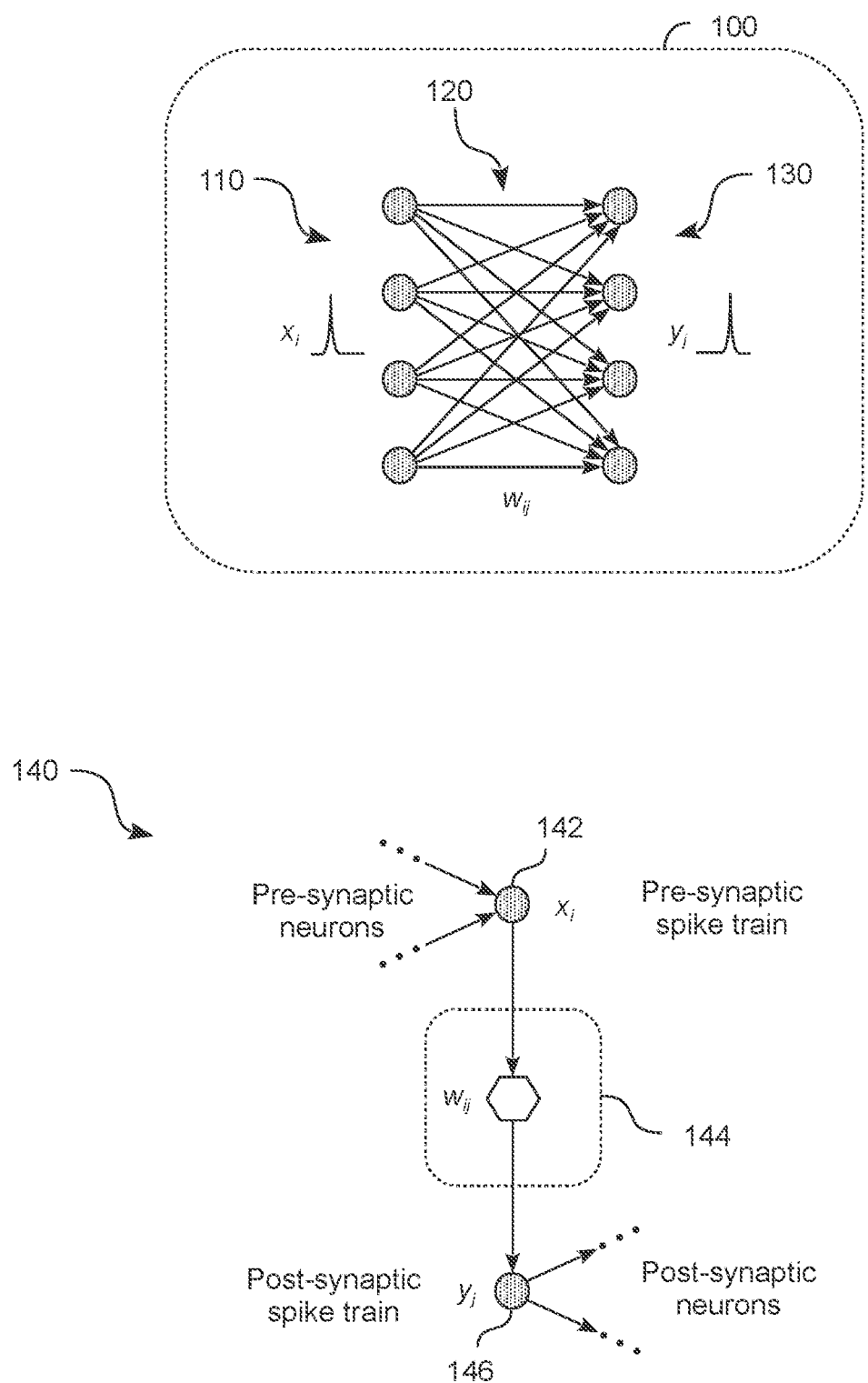
FIG. 1 shows diagrams each illustrating features of a simplified neural network according to an embodiment.

Embodiments discussed herein variously provide techniques and mechanisms for determining condition likelihood information with a spiking neural network, where the determined condition likelihood represents corresponding probabilities of a Bayesian network for generating a Bayesian inference. Various embodiments of the neural graphical models associated with the spiking neural network are based on interaction between neural oscillations. Neuron each represent a respective variable of interest, while their synaptic connections represent conditional dependence structure between these variables. The spiking activities oscillate, and the magnitude of the oscillations represent corresponding probabilities. When (a subset of) random variables are observed at some of the leaf nodes of the graph, the evidences are propagated as equivalent phase-shifts from the leaf nodes towards the center nodes; the combination of propagating waves and phase-shifts modulate the oscillations of neurons throughout the graph, and thereby modulating the corresponding probabilities of a Bayesian network for generating the Bayesian inference. A plurality of nodes of a spiking neural network may each represent or otherwise correspond to a respective condition which, for example, includes a condition local to the spiking neural network or a condition of a system which the spiking neural network is to evaluate. For a given node, a corresponding condition may result in a signal being received by (or communicated from) that node. For example, a given node may be configured to receive a signal and to recognize that a predefined pattern and/or timing of the signal is to indicate an instance of a condition to which that node corresponds. In some embodiments, the spiking neural network is to perform one or more Bayesian inference operations—e.g., wherein some or all of the plurality of nodes each correspond to a respective condition (or "variable") of a Bayesian network. As used herein, "Bayesian inference" and "Bayesian inference operation" variously refer to processing which changes a value, signal characteristic and/or other system state to indicate an updated probability of a condition in a Bayesian network. Such an updated probability may be used in the subsequent selection of one condition of the Bayesian network over one or more other such conditions—e.g., wherein the Bayesian inference operation further comprises such selection.

A plurality of nodes of the spiking neural network may each receive a respective bias signal, at least some component of which is sinusoidal or otherwise cyclically varying with time. Such a plurality of nodes may each receive the same bias signal or, alternatively, some or all of the plurality of nodes may each receive a different respective bias signal. In an embodiment, cyclical components of some or all such bias signals each have the same frequency. Based on such biasing, the plurality of nodes may variously exhibit resonance with each other—e.g., in terms of the nodes' respective membrane potentials and/or synaptic signaling. Such resonance between the nodes may be based on a coupling of nodes to each other, and further based on a common frequency component of one or more bias signals which are variously provided to the nodes.

Respective node types of two given nodes—referred to herein as a "parent node" type and a "child node" type—may be based at least in part on a functional relationship between said nodes. For a given first node and second node, the first node may function as a parent node with respect to the second node, where (in turn) the second node functions as a child node with respect to the first node. A parent node represents an event, entity and/or state that causally precedes (with a given probability) the entity or event represented by a respective child node. In some embodiments, a given node is a child node with respect to one node and, concurrently, is a parent node with respect to another node. Alternatively or in addition, a node may be a parent node to each of multiple respective child nodes and/or a child node to each of multiple respective parent nodes. During operation of the spiking neural network, a parent node may send to a respective child node a signal which is referred to herein as a "likelihood signal." Alternatively or in addition, the child node may send to the parent node another signal, which is referred to herein as an "adjustment signal."

As used herein, "likelihood signal" refers to a signal which is communicated from a parent node to a child node, wherein a characteristic of the signal indicates a likelihood (e.g., a current probability) of a condition to which the parent node corresponds. Such a signal characteristic may include a rate (e.g., a frequency), an amplitude, a predefined pattern and/or a timing—relative to some reference time, for example—of at least some signal spike(s) or other component of the likelihood signal. For example, a node may provide a likelihood signal that—during at least some period of time—includes a cyclical component which is based at least in part on a cyclical characteristic of that node's bias signal. The cyclical component may be further based on one or more other likelihood signals which are received by that node each from a respective parent node (the one or more other likelihood signal each including a respective cyclical component). In one embodiment, a "rate-amplitude" characteristic of such a likelihood signal indicates a likelihood of the characteristic to which that node corresponds.

As used herein, "rate-amplitude" refers to a characteristic of a signal which has some rate of spiking (or "spiking rate") which varies during at least some period of time. The spiking rate may be moving average rate which is based on the number of signal spikes that occur in a time period of a sample window. The rate of spiking may include a cyclical component which oscillates or otherwise varies between a first rate of signal spiking and a second signal spiking. For a given period of time, the rate-amplitude of such a signal is an amplitude of the variation by the signal's spiking rate.

As used herein, "adjustment signal" refers herein to a signal which is communicated, from a child node to a parent node, to indicate that the parent node is to adjust a phase of a bias signal which is provided to that parent node. The parent node may be configured to receive the adjustment signal and to recognize that some predefined spike pattern, timing and/or other characteristic of the adjustment signal is to specify or otherwise indicate an adjustment to the value of a phase change applied to the bias signal. Such an adjustment signal may be based at least in part on a current probability of a condition to which the child node corresponds. This probability may be indicated by a characteristic, such as a rate-amplitude, of a membrane potential at the child node—e.g., where the characteristic is based on a phase change (if any) that is applied to a bias signal at the child node. In some embodiments, the adjustment signal is further based at least in part on a conditional probability of a first condition given a second condition (wherein the first condition and the second condition correspond to the child node and the parent node, respectively). This conditional probability may be indicated by a weight that is assigned to a synapse by which the child node receives the likelihood signal. The adjustment signal may be communicated from a child node to a parent node based on that child node receiving a respective "instance signal."

As used herein, "instance signal" refers to a signal which is provided to a node to indicate an instance of the condition to which the node corresponds. For example, an instance signal may be received by a node from a source which is external to the spiking neural network. Alternatively, an instance signal may be generated based on operations of one or more other nodes of the spiking neural network. In response to the instance signal, the receiving node may communicate one or more adjustment signals each to a respective parent node.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a spiking neural network.

In some embodiments, nodes of a spiking neural network are of a Leaky Integrate-and-Fire (LIF) type—e.g., wherein, based on one or more spiking signals received at a given node j, the value of a membrane potential $v_m$ of that node j may spike and then decay over time. The spike and decay behavior of such a membrane potential $v_m$ may, for example, be according to the following:

$$\tau_m \left( \frac{dv_m}{dt} \right) \propto -(v_m - v_{rest}) + w_{ij} \cdot I_{ij} + J_b, \quad (1)$$

where $w_{rest}$ is a resting potential toward which membrane potential $v_m$ is to settle, $\tau_m$ is a time constant for an exponential decay of membrane potential $v_m$, $w_{ij}$ is a synaptic weight of a synapse from another node i to node j, $I_{ij}$ is a spiking signal (or "spike train") communicated to node j via said synapse, and $J_b$ is a value that, for example, is based on a bias current or other bias signal provided to node j from some external node/source. The spiking neural network may operate based on a pre-defined threshold voltage $V_{threshold}$, wherein the node j is configured to output a signal spike in response to its membrane potential $v_m$ being greater than $V_{threshold}$.

FIG. 1 illustrates an example diagram of a simplified neural network 100, providing an illustration of connections 120 between a first set of nodes 110 (e.g., neurons) and a second set of nodes 130 (e.g., neurons). In various embodiments, some or all of a neural network (such as the simplified neural network 100) may be organized into multiple layers—e.g., including input layers and output layers. It will be understood that the simplified neural network 100 only depicts two layers and a small number of nodes, but other forms of neural networks may include a large number of variously configured nodes, layers, connections, and pathways. For example, a neural network may be a monolithic single layer, with an arbitrary connection graph representing the causal connection strengths between the respective conditions which nodes of the layer variously represent.

Data that is provided into the neutral network 100 may be first processed by synapses of input neurons. Interactions between the inputs, the neuron's synapses and the neuron itself govern whether an output is provided via an axon to another neuron's synapse. Modeling the synapses, neurons, axons, etc., may be accomplished in a variety of ways. In an example, neuromorphic hardware includes individual processing elements in a synthetic neuron (e.g., neurocore) and a messaging fabric to communicate outputs to other neurons. The determination of whether a particular neuron "fires" to provide data to a further connected neuron is dependent on the activation function applied by the neuron and the weight of the synaptic connection (e.g., $w_{ij}$) from neuron i (e.g., located in a layer of the first set of nodes 110) to neuron j (e.g., located in a layer of the second set of nodes 130). The input received by neuron i is depicted as value $x_i$, and the output produced from neuron j is depicted as value $y_j$. Thus, the processing conducted in a neural network is based on weighted connections, thresholds, and evaluations performed among the neurons, synapses, and other elements of the neural network.

In an example, the neural network 100 is established from a network of spiking neural network cores, with the neural network cores communicating via short packetized spike messages sent from core to core. For example, each neural network core may implement some number of primitive nonlinear temporal computing elements as neurons, so that when a neuron's activation exceeds some threshold level, it generates a spike message that is propagated to a fixed set of fanout neurons contained in destination cores. The network may distribute the spike messages to all destination neurons, and in response those neurons update their activations in a transient, time-dependent manner, similar to the operation of real biological neurons.

The neural network 100 further shows the receipt of a spike, represented in the value $x_i$, at neuron i in a first set of neurons (e.g., a neuron of the first set of nodes 110). The output of the neural network 100 is also shown as a spike, represented by the value $y_j$, which arrives at neuron j in a second set of neurons (e.g., a neuron of the first set of nodes 110) via a path established by the connections 120. In a spiking neural network all communication occurs over event-driven action potentials, or spikes. In an example, spikes convey no information other than the spike time as well as a source and destination neuron pair. Computations may variously occur in each a respective neuron as a result of the dynamic, nonlinear integration of weighted spike input using real-valued state variables. The temporal sequence of spikes generated by or for a particular neuron may be referred to as its "spike train."

In an example of a spiking neural network, activation functions occur via spike trains, which means that time is a factor that has to be considered. Further, in a spiking neural network, each neuron may provide functionality similar to that of a biological neuron, as the artificial neuron receives its inputs via synaptic connections to one or more "dendrites" (part of the physical structure of a biological neuron), and the inputs affect an internal membrane potential of the artificial neuron "soma" (cell body). In a spiking neural network, the artificial neuron "fires" (e.g., produces an output spike), when its membrane potential crosses a firing threshold. Thus, the effect of inputs on a spiking neural network neuron operate to increase or decrease its internal membrane potential, making the neuron more or less likely to fire. Further, in a spiking neural network, input connections may be stimulatory or inhibitory. A neuron's membrane potential may also be affected by changes in the neuron's own internal state ("leakage").

FIG. 1 also illustrates an example inference path 140 in a spiking neural network, such as may be implemented by a form of the neural network 100 or other forms of neural networks. The inference path 140 of the neuron includes a pre-synaptic neuron 142, which is configured to produce a pre-synaptic spike train $x_i$ representing a spike input. A spike train is a temporal sequence of discrete spike events, which provides a set of times specifying at which time a neuron fires.

As shown, the spike train $x_i$ is produced by the neuron before the synapse (e.g., neuron 142), and the spike train $x_i$ is evaluated for processing according to the characteristics of a synapse 144. For example, the synapse may apply one or more weights, e.g., weight $w_{ij}$, which are used in evaluating the data from the spike train Input spikes from the spike train $x_i$ enter a synapse such as synapse 144 which has a weight $w_{ij}$. This weight scales what the impact of the presynaptic spike has on the post-synaptic neuron (e.g., neuron 146). If the integral contribution of all input connections to a post-synaptic neuron exceeds a threshold, then the post-synaptic neuron 146 will fire and produce a spike. As shown, $y_j$ is the post-synaptic spike train produced by the neuron following the synapse (e.g., neuron 146) in response to some number of input connections. As shown, the post-synaptic spike train $y_j$ is distributed from the neuron 146 to other post-synaptic neurons.

FIG. 2A shows features of a spiking neural network 200 to implement a Bayesian inference operation according to an embodiment. FIG. 2A also includes a legend 201 showing respective symbols for a network node, a bias signal, a likelihood signal, an instance signal and an adjustment signal. Spiking neural network 200 is one example of an embodiment wherein a parent node communicates a likelihood signal to a respective child node which subsequently signals back to the parent node that a phase adjustment is to be made to a bias current. Spiking neural network 200 may include some or all of the features of spiking neural network 100, for example.

As shown in FIG. 2A, spiking neural network 200 includes a plurality of nodes variously coupled to one another via synapses, the plurality of nodes each to receive a respective bias signal which is sinusoidal or otherwise cyclical. By way of illustration and not limitation, nodes 210, 220, 230 of network 200 may variously receive respective bias signals 212, 222, 232. Based at least in part on such bias signals, the plurality of nodes may variously exhibit resonance coupling—e.g., at least with respect to synaptic signaling and/or respective membrane voltages of the plurality of nodes. For example, respective signals at nodes 210, 220, 230 may each exhibit at least some resonance at a first frequency. Such resonance coupling may facilitate the representation of a probability using the application of a phase change to a bias signal.

In the example embodiment shown, node 210 and node 230 are to function, relative to each other, as parent node and child node, respectively. Node 210 is further coupled to receive one or more likelihood signals 224 each from a respective other node (such as node 220) of the spiking neural network—e.g., wherein node 210 is also to function as a child node to each such other node. Node 210 may apply a change to a phase of bias signal 212, wherein the phase change (and/or a signal which is based on the phase change) is indicative of a probability of a condition to which node 210 corresponds. In such an embodiment, node 210 generates a likelihood signal 218 based on bias signal 212 (and on any phase change applied thereto) and further based the one or more likelihood signals 224. One or more operations to generate signal spikes of likelihood signal 218 may be adapted, for example, from conventional Leaky Integrate-and-Fire (LIF) neuron techniques. A cyclical component of likelihood signal 218 may be based on both the phase-adjusted bias signal 212 and the resonance coupling of the plurality of nodes to each other. A characteristic of such a cyclical component—e.g., including a rate-amplitude—may represent or otherwise indicate a probability of a condition to which node 210 corresponds. The likelihood signal 218 may be communicated to one or more child nodes which, in this example, includes node 230.

Node 230 may be configured to indicate, with an adjustment signal 234, an adjustment (if any) that is to be made to the phase change which node 210 applies to bias signal 212. A membrane voltage of node 230 may be generated based on bias signal 232—e.g., wherein a cyclical component of the membrane voltage is based on a phase change (if any) which node 230 applies to bias signal 232. In an embodiment wherein node 230 also functions as a parent node with respect to some one or more other nodes, such a phase change applied to bias signal 232 may be based on one or more other adjustment signals (not shown) each received by node 230 from the one or more other nodes.

Node 230 may be further coupled to receive an instance signal 236 which indicates an instance of the condition to which node 230 corresponds. Instance signal 236 may be provided for example, from some sensor, test unit or other source which is external to spiking neural network 200 (or alternatively, from some other node of spiking neural network 200). Some embodiments are not limited with respect to a particular source from which instance signal 236 is received. Based on the indication provided by instance signal 236, node 230 may indicate—via adjustment signal 234—an amount by which a phase change for bias signal 212 is to be adjusted. Based on adjustment signal 234, node 210 may adjust a phase change to bias signal 212. Such adjusting may include determining whether or not a change is to be applied to a phase of bias signal 212, determining an amount by which phase is to be changed, and/or determining whether an amount of phase change is to be adjusted. Such adjusting to the phase change at node 210 may result in likelihood signal 218 indicating a different value for the probability of the condition to which node 210 corresponds. As a result, spiking neural network 200 may implement a Bayesian inference operation which changes respective values of one or more probabilities.

Although some embodiments are not limited in this regard, node 210 may be further coupled to receive one or more other adjustment signals (not shown) each from a respective other child node—e.g., wherein likelihood signal 218 is also communicated to each such other child node. In such an embodiment, the phase change applied to bias signal 212 may be further adjusted based on such one or more other adjustment signals.

Figure 2B:
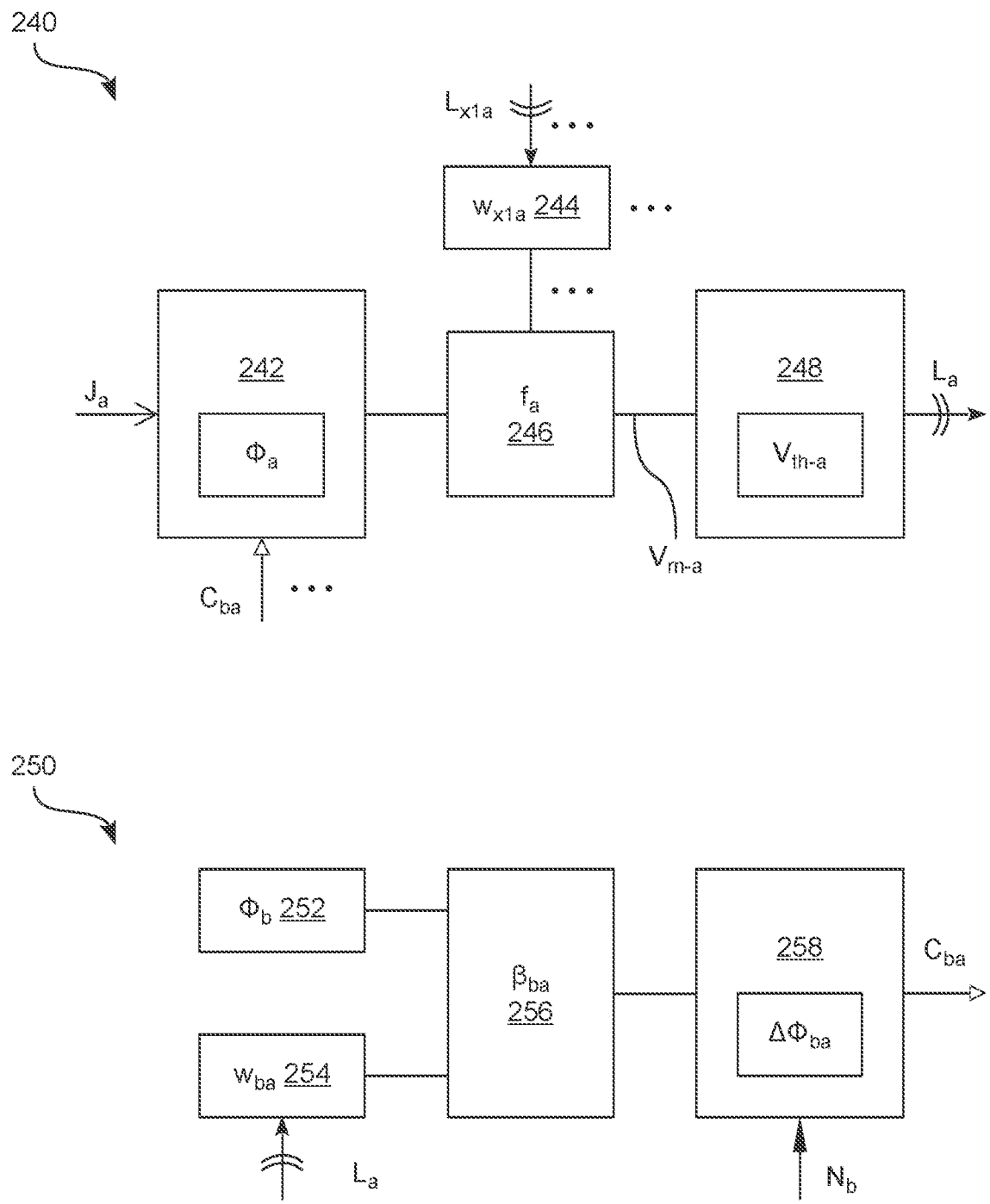
FIG. 2B is a functional block diagram illustrating elements of neural network nodes according to an embodiment.

FIG. 2B shows features of spiking neural network nodes 240, 250 each to participate in a Bayesian inference operation according to an embodiment. In FIG. 2B, the functional blocks shown each represent respective circuitry, executing software and/or other logic to provide a corresponding functionality thereof. Nodes 240, 250 may include respective features of nodes 210, 230, for example.

In terms of operation with each other, nodes 240, 250 are to function as parent node and child node, respectively. Nodes 240, 250 may correspond, respectively, to a condition A and to a condition B which has at least some dependency on condition A. Conditions A, B may be respective parameters of a Bayesian network which is implemented with a spiking neural network.

Such a spiking neural network may be initialized according to a Bayesian network design which defines, for each given node of a plurality of nodes, an initial probability of a condition to which that given node is to correspond. Such a probability may be indicated based at least in part on a phase change which the given node is to apply to a respective bias current. For each child node of the plurality of nodes, the Bayesian network design may define a respective conditional probability of a condition to which that child node corresponds given another condition to which that child node's respective parent node corresponds. Such a conditional probability may be indicated, for example, by a weight which is assigned to a synapse by which the child node receives a likelihood signal. The particular probability values of a given initialization state may be determined based on conventional Bayesian network design techniques, and are not limiting on some embodiments.

Referring to node 240, a cyclical bias signal $J_a$ may be received at a block 242 which applies a phase change $\phi_a$ thereto. At a given time, an amount of phase change $\phi_a$ may be based on one or more adjustment signals (such as the illustrative adjustment signal $C_{ba}$ shown) which are communicated to node 240 each from a respective child node. The phase-changed version of bias signal $J_a$ may be provided to another block 246 which, for example, is operates based on one or more likelihood signals each from a respective other node (not shown). By way of illustration and not limitation, node 240 may receive a likelihood signal $L_{x1a}$ from another node which functions as a parent node to node 240. A weight $w_{x1a}$ 244—assigned to a synapse by which node 240 receives $L_{x1a}$—may be applied by node 240 to $L_{x1a}$.

Block 246 may generate a membrane voltage $V_{m-a}$ as a function $f_a$ of bias signal $J_a$, of the phase change $\phi_a$ applied thereto, and of the likelihood signal $L_{x1a}$ (as weighted by $w_{x1a}$ 244). Some features of function $f_a$ may be adapted, for example, from any of a variety of Leaky Integrate-and-Fire (LIF) techniques for generating a spiking signal—e.g., where function $f_a$ includes features of equation (1) described herein. Another block 248 of node 240 may generate a likelihood signal La based on membrane voltage $V_{m-a}$.

For example, block 248 may generate one or more spikes of likelihood signal $L_a$ in response to $V_{m-a}$ crossing or otherwise reaching $V_{tb-a}$. A rate-amplitude and/or other characteristic(s) of likelihood signal $L_a$ may indicate a current probability of the condition A to which node 240 corresponds. Signal $L_a$ may be sent to node 250 (and, in some embodiments, to one or more other child nodes to node 240). Subsequently, node 250 may communicate to node 240 an adjustment signal $C_{ba}$ which indicates an amount by which phase change $\phi_a$ is to be adjusted. Such adjusting of phase change $\phi_a$ may result in likelihood signal $L_a$ subsequently indicating an updated value of the probability of condition A.

For example, node 250 may apply a synaptic weight $w_{ba}$ 254 to likelihood signal $L_a$. Furthermore, node 250 may receive a bias signal (not shown)—such as bias signal 232—and apply a phase change $\phi_b$ 252 thereto. In such an embodiment, adjustment signal $C_{ba}$ may be generated based at least in part on phase change $\phi_b$ 252 and synaptic weight $w_{ba}$ 254—e.g., where a block 256 determines a scale factor $\beta_{ba}$ based on respective probabilities which are indicated by synaptic weight $w_{ba}$ 254 and phase change $\phi_b$ 252. It is noted that adjustment signal $C_{ba}$ may be independent of likelihood signal $L_a$, in some embodiments.

A value of synaptic weight $w_{ba}$ 254 may represent or otherwise indicates a conditional probability P(B|A) of condition B given condition A. Alternatively or in addition, phase change $\phi_b$ 252 may indicate a probability P(B) of condition B. Initial values of such probabilities P(B) and P(B|A) may be predefined as part of an initialization state of the spiking neural network. Where node 250 is also a parent node to one or more other nodes, P(B) may be subsequently updated during operation of the spiking neural network—e.g., where conditional probability P(B|A) is a fixed value (as is the corresponding synaptic weight $w_{ba}$ 254). Any such updating of P(B) may include adjusting an amount of phase change $\phi_b$ 252 using techniques similar to those used to update phase change $\phi_a$.

In one embodiment, block 256 determines a value of scale factor $\beta_{ba}$ as a function of the ratio $\{P(B|A)/P(A)\}$—e.g., according to the following function:

$$\beta_{ba}=[\{P(B|A)/P(A)\}-1]. \quad (2)$$

In such an embodiment, scale factor $\beta_{ba}$ indicates whether an association (dependency) between conditions A and B is positive or negative. Based on such a correlation, adjustment signal $C_{ba}$ may signal whether phase change $\phi_a$ is to be increased or decreased.

Block 256 may communicate a value of scale factor $\beta_{ba}$ to another block 258 of node 250—e.g., wherein block 258 generates the adjustment signal $C_{ba}$ based on $\beta_{ba}$. For example, adjustment signal $C_{ba}$ may indicate or otherwise be based on a value equal to the product $[\beta_{ba}]\cdot[\Delta\phi_{ba}]$, where $\Delta\phi_{ba}$ is a phase adjustment value corresponding to both phase change $\phi_a$ and a given instance of the condition B to which node 250 corresponds. The value of $\Delta\phi_{ba}$ may correspond to an incremental amount by which P(A) is to change in response to a given instance of P(B). For example, a value of $\Delta\phi_{ba}$ may be based on an initially defined parameter which is part of a Bayesian network design. In one embodiment, the value of $\Delta\phi_{ba}$ is variable—e.g., based on an instance signal $N_b$ which is to indicate an instance of condition B. For example, a value of $\Delta\phi_{ba}$ at any given time may represent or otherwise indicate a detected strength (e.g., a rate of signal spiking) of instance signal $N_b$. In still other embodiments, the value of $\Delta\phi_{ba}$ indicates or is otherwise based on a maximum allowable value of phase change $\phi_a$, a range of allowable values for phase change $\phi_a$, or the like. Node 250 may be preconfigured to recognize a predefined pattern, timing and/or other characteristic of $C_{ba}$ as indicating an amount by which phase change $\phi_{ba}$ is to be adjusted.

Accordingly, node 240 may generate adjustment signal $C_{ba}$ based on both phase change $\phi_b$ 252 and weight $w_{ba}$ 254, where weight $w_{ba}$ 254 indicates P(B|A) and where, based on phase change $\phi_b$, 252, a membrane voltage of node 240—and/or a likelihood signal $L_b$ (not shown) from node 240—indicates P(B). For example, adjustment signal $C_{ba}$ may be based on scale factor $\beta_{ba}$ and phase adjustment value $\Delta\phi_{ba}$. Although some embodiments are not limited in this regard, node 240 may be further coupled to some other child node (not shown) also receives likelihood signal $L_a$—e.g., where the other child node corresponds to a condition C.

In such an embodiment, this other child node may further comprise additional circuitry and/or executing software to similarly generate another adjustment signal $C_{ca}$ based on a phase change $\phi_c$ (which that child node applies to a bias signal) and a weight $w_{ca}$ which that child node applies to likelihood signal $L_a$. The weight $w_{ca}$ may indicate a probability P(C|A)—e.g., where, based on phase change $\phi_c$, a membrane voltage of that other child node—and/or a likelihood signal $L_c$ from that other child node—indicates P(C). Adjustment signal $C_{ca}$ may be based on scale factor $\beta_{ca}$ and phase adjustment value $\Delta\phi_{ca}$ having respective features of scale factor $\beta_{ba}$ and phase adjustment value $\Delta\phi_{ba}$, for example. Block 242 may be coupled to further receive this adjustment signal $C_{ca}$, where block 242 is to further adjust phase change $\phi_a$ based on an adjustment value indicated by adjustment signal $C_{ca}$. Although some embodiments are not limited in this regard, an amount of phase change $\phi_b$ 252 may also be adjusted during operation of the spiking neural network—e.g., where such adjusting is based on signal exchanges similar to those which result in phase change $\phi_a$ being adjusted.

Phase change $\phi_a$ may be limited to some predefined range of allowable values. Such a limited range of phase change $O_a$ may be enforced by node 210, for example. In an embodiment, the phase change $\phi_a$ is allowed to vary by an amount which is equal to or less than pi ($\pi$) radians—e.g., wherein the phase change $\phi_a$ is always within a range of 0 to $\pi$ (or in a range of a range of $-\pi/2$ to $\pi/2$, for example). In some embodiments, such a phase change is allowed to vary by an amount which is equal to or less than $0.8\pi$ radians—e.g., where the amount which is equal to or less than $0.7\pi$. A more limited range for phase change $\phi_a$—e.g., a range of $0.1\pi$ to $0.9\pi$—may facilitate a relatively more linear relationship between multiple concurrent adjustments to phase change $\phi_a$ (each such adjustment based on a respective adjustment signal) and corresponding changes to the probability which is indicated by the likelihood signal $L_a$. As a result, concurrent changes to the probability—each in response to a different respective child node—may be more linearly additive to each other (or more linearly offsetting of each other).

Figure 4:
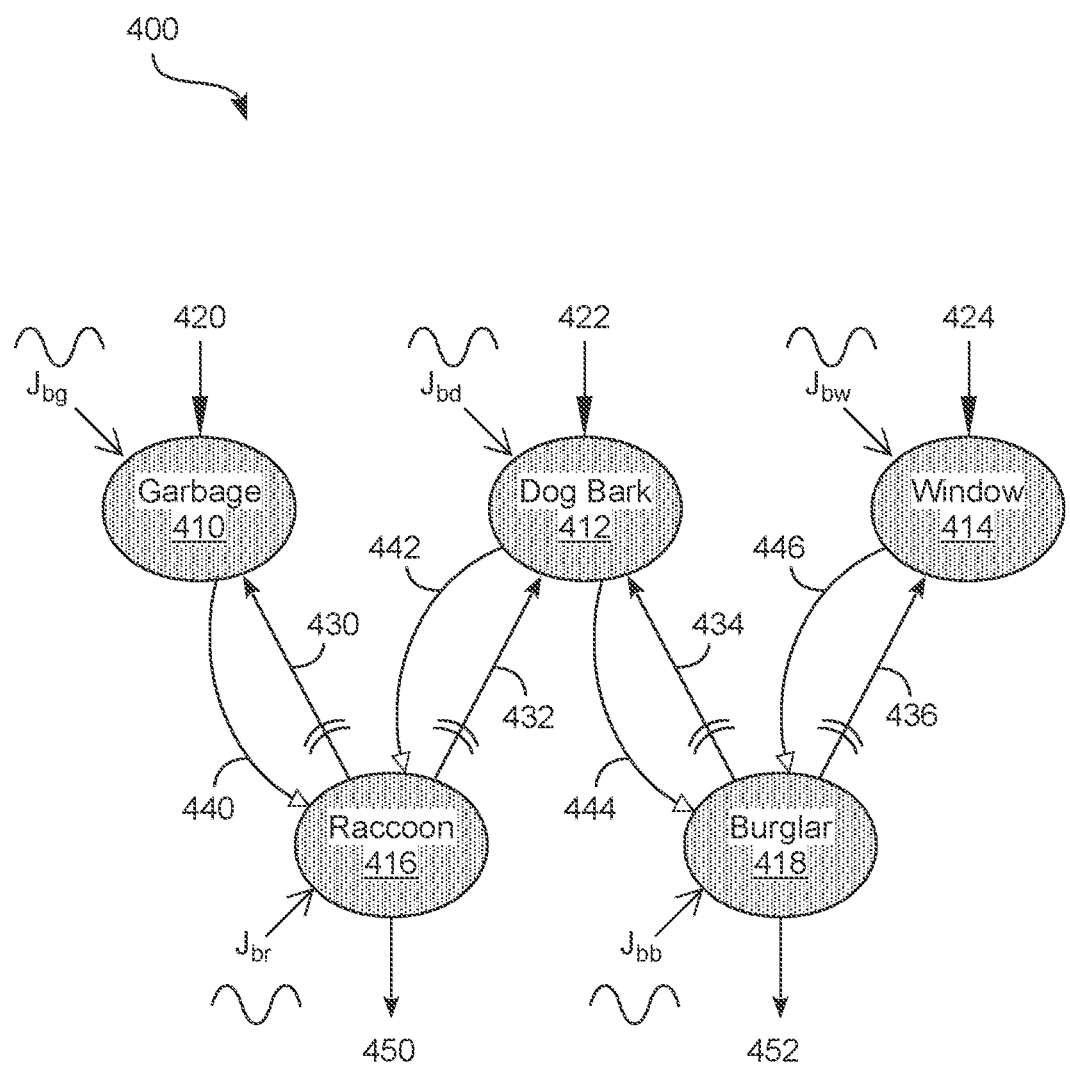
FIG. 4 is a functional block diagram illustrating features of a spiking neural network to perform a Bayesian inference operation according to an embodiment.

FIG. 3 shows features of a method 300 to operate a spiking neural network according to an embodiment. Method 300 may be performed with one of spiking neural networks 100, 200—e.g., wherein method 300 includes communicating one or more signals between nodes 240, 250. To illustrate certain features of various embodiments, method 300 is described herein with reference to a spiking neural network 400 which is shown in FIG. 4. However, such description may be extended to apply to any of various different spiking neural networks which are configured to adjust a phase change to a bias current, wherein, based on the phase change, a membrane voltage or likelihood signal of a node indicates a probability of a condition to which that node corresponds.

Method 300 may comprise (at 310) receiving a first bias signal and a second bias signal, respectively, at a first node and a second node of a spiking neural network. The first node may correspond to a first condition, where the second node corresponds to a second condition that, for example, has a dependency relationship with the first condition. Referring now to FIG. 4, a spiking neural network 400 may be configured to perform a Bayesian inference operation according to an embodiment. Spiking neural network 400 may include some or all of the features of spiking neural network 200, for example. Spiking neural network 400 is one example of an embodiment wherein a plurality of nodes are each to receive a respective bias signal, wherein synapses variously coupled between respective ones of the plurality of nodes each correspond to a respective dependency relationship of the Bayesian network. A resonance coupling of the plurality of nodes may facilitate the application of a phase change to a bias signal as a mechanism for determining (e.g., including updating) a probability of a given variable.

In FIG. 4, spiking neural network 400 includes nodes 410, 412, 414, 416, 418 which each correspond to respective conditions (parameters) of a Bayesian network. As illustrated by the example embodiment, the Bayesian network may include conditions whereby a determination is to be made regarding a house or other residential property. For example, node 410 may correspond to a condition G of a garbage can being turned over—e.g., where node 412 corresponds to a condition D of a dog barking and node 414 corresponds to a condition W of a window being broken. Node 416 may correspond to a condition R of a raccoon being on the property—e.g., where node 418 corresponds to a condition B of a burglar being on the property. In such an embodiment, nodes 410, 412 may each be a respective child node to node 416—e.g., to reflect dependency relationships wherein condition R may result in (and may be indicated by) one or both of condition G or condition D. Alternatively or in addition, nodes 412, 414 may each be a respective child node to node 418—e.g., to reflect dependency relationships wherein condition B may result in (and may be indicated by) one or both of condition D or condition W. The different parent-child dependency relationships between respective ones of nodes 410, 412, 414, 416, 418 are represented by respective synapses variously coupled to communicate likelihood signals 430, 432, 434, 436. In some embodiments, likelihood signals 430, 432 are equal to each other and/or likelihood signals 434, 436 are equal to each other.

Although some embodiments are not limited in this regard, method 300 may further comprise selecting one condition of the Bayesian network over one or more other conditions of the Bayesian network, where the selection is based on the adjusting at 360. For example, evaluation logic coupled to (or alternatively, part of) the spiking neural network may receive likelihood signals each from a different respective node of the spiking neural network. In such an embodiment, the selecting may include detecting whether one of the received likelihood signals satisfies one or more predefined test criteria. By way of illustration and not limitation, such test criteria—e.g., including a minimum threshold probability value, a minimum threshold difference between two probability values, and/or the like—may define when a condition corresponding to a given likelihood signal is considered sufficiently probable (on its own or, alternatively, in relation to the probability of one or more other conditions) to justify selection of that condition. In response to detecting that one of the received likelihood signals satisfies the test criteria, the evaluation logic may generate a signal which indicates a selection of the condition corresponding to the node which provides the likelihood signal.

Referring again to FIG. 4, one or more additional synaptic signals—such as the illustrative signals 450, 452 shown—may signal to other nodes of network 400 (or signal to evaluation circuitry which is external to network 400) whether an instance of a particular one of conditions R, B is indicated, to at least some threshold probability. Evaluation of signals 450, 452 may detect whether a probability indicated by one or nodes 416, 418 satisfies one or more test criteria. For example, such testing may detect whether one of P(R) or P(B) is above some minimum threshold probability value. Alternatively or in addition, such testing may detect whether one of values [P(R)−P(B)] or [P(B)−P(R)] is above some minimum threshold probability difference value. In response to such detecting, the evaluation circuitry may output or otherwise generate a signal indicating a selection of one of nodes 416, 418 (and thus, a selection of the condition to which that node corresponds).

Referring again to method 300, the receiving at 310 may include nodes 410, 412, 414, 416, 418 receiving respective bias signals $J_{bg}$, $J_{bd}$, $J_{bw}$, $J_{br}$, $J_{bb}$ which are each sinusoidal or otherwise cyclical. For example, each of bias signals $J_{bg}$, $J_{bd}$, $J_{br}$, $J_{bw}$, $J_{bb}$ may have the same frequency ω. Method 300 may further comprise (at 320) applying a change to a phase of the first bias signal. For example, an initial configuration of spiking neural network 400 may include or otherwise be based on respective predefined initial values for probabilities P(G), P(D), P(W), P(R), and P(B) of conditions G, D, W, R and B. For example, P(R) may be indicated by a rate-amplitude (or other characteristic) of likelihood signal 430 or of a membrane voltage at node 416. This indication of P(R) may be based at least in part on a phase change which node 416 is to apply to bias signal $J_{br}$. Similarly, P(B) may be indicated by a characteristic of likelihood signal 430 or a membrane voltage at node 416—e.g., where such indication of P(B) is based at least in part on a phase change which node 418 is to apply to bias signal $J_{bb}$. In such an embodiment, an indication of P(G) by a membrane voltage of node 410 may be based on a phase change which node 410 is to apply to bias signal $J_{bg}$—e.g., where an indication of P(D) by a membrane voltage of node 412 is based on a phase change which node 412 is to apply to bias signal $J_{bd}$. Similarly, an indication of P(W) by a membrane voltage of node 414 may be based on a phase change which node 414 is to apply to bias signal $J_{bw}$.

The initial configuration of spiking neural network 400 may further include or otherwise be based on conditional probabilities P(G|R), P(D|R), P(D|B), and P(W|B). For example, P(G|R) may be represented or otherwise indicated by a synaptic weight which node 410 is to apply to likelihood signal 430—e.g., where P(D|R) is indicated by a synaptic weight which node 412 is to apply to likelihood signal 432. Similarly, P(D|B) may be indicated by a synaptic weight which node 412 is to apply to likelihood signal 434—e.g., where P(W|B) is indicated by a synaptic weight which node 414 is to apply to likelihood signal 436. Some or all such probabilities may be provided, a priori, as input parameters based on a predefined Bayesian network design. Operation of spiking neural network may signal a change to a given probability by adjusting a phase change to a bias signal based on one or more instance signals.

During an initialization state of spiking neural network 400, the same phase change (if any) may be concurrently applied to each of $J_{bg}$, $J_{bd}$, $J_{bw}$, $J_{br}$, $J_{bb}$—e.g., where nodes 410, 412, 414, 416, 418 exhibit some baseline (in-phase, for example) coupled resonance state. As a result, P(R) and P(B) may be equal to one another at least initially, P(G), P(D) and P(W) may be equal to one another at least initially, or the like.

In an embodiment, method 300 further comprises (at 330) communicating a third signal—a likelihood signal—from the first node to the second node in response to the change to the phase of the first bias signal. Based on the change, the third signal indicates a likelihood of the first condition. A characteristic of the third signal (such as a rate-amplitude) may indicate the likelihood of the first condition. Referring again to spiking neural network 400, the communicating at 330 may include node 416 communicating one or both of likelihood signals 430, 432 and/or node 418 communicating one or both of likelihood signals 434, 436.

Method 300 may further comprise (at 340) receiving at the second node a signal—an instance signal—which indicates an instance of the second condition. By way of illustration and not limitation, instance signals 420, 422, 424 may be communicated to nodes 410, 412, 414 (respectively). Node 410 may be configured to recognize a spike pattern, timing and/or other characteristic of instance signal 420 as indicating an instance of condition G. Similarly, a characteristic of instance signal 422 may indicate to node 412 an instance of condition D and/or a characteristic of instance signal 424 may indicate to node 414 an instance of condition W.

In response to the instance of the second condition, method 300 (at 350) may communicate, from the second node to the first node, a fourth signal—and adjustment signal—which is based on the second bias signal. The fourth signal may be further based on a conditional probability of the second condition given the first condition. For example, the third signal may be communicated via a synapse coupled between the first node and the second node, wherein a weight assigned to the synapse indicates the conditional probability of the second condition given the first condition. In some embodiments, the fourth signal is based on a ratio of the conditional probability to a probability of the second condition.

Referring again to spiking neural network 400, the communicating at 350 may include node 410 sending adjustment signal 440, node 412 sending one or both of adjustment signals 442, 444 and/or node 414 sending adjustment signal 446. Generation of some or all of adjustment signals 440, 442, 444, 446 may include operations such as those performed at 350, for example.

Based on the fourth signal, method 300 may adjust (at 360) an amount of the change to the phase of the first bias signal. For example, node 416 may adjust an amount of a phase change which is applied to bias signal $J_{br}$—e.g., based on one or both of adjustment signals 440, 442. Alternatively or in addition, node 418 may adjust an amount of a phase change which is applied to bias signal $J_{bb}$—e.g., based on one or both of adjustment signals 444, 446. In response to such an adjustment to a phase change, a characteristic of one of likelihood signals, 430, 432, 434, 436 may be altered, thereby indicating a change to a probability of condition R or a change to a probability of condition B.

Although some embodiments are not limited in this regard, one or more other nodes (in addition to the second node) may each function as a child node of the first node. In such an embodiment, method 300 may further comprise receiving a third bias signal at some third node which corresponds to a third condition, and communicating the third signal from the first node to the third node. For example, node 416, 410, 412 of spiking neural network 400 may be the first node, second node, and third node (respectively)—e.g., wherein both of likelihood signals 430, 432 include the third signal. In such an embodiment, method 300 may further comprise receiving at the third node a signal (e.g., instance signal 422) which indicates an instance of the third condition. In response to the instance of the third condition, the third node may communicate to the first node a fifth signal (e.g., adjustment signal 442) which is based on the third bias signal (and on any phase change applied thereto). Subsequently, the amount of the change to the phase of the first bias signal may be further adjusted based on the fifth signal. In such an embodiment, adjusting the amount of the change to the phase of the first bias signal based on the fifth signal may be concurrent with an adjustment which is a result of operation 360.

Alternatively or in addition, one or more other nodes (in addition to the first node) may each function as a parent node of the second node. In such an embodiment, method 300 may further comprise receiving a third bias signal at some third node which corresponds to a third condition, and applying a change to a phase of the third bias signal. For example, node 416, 412, 418 of spiking neural network 400 may be the first node, second node, and third node (respectively). In such an embodiment, method 300 may further communicate a fifth signal (e.g., likelihood signal 434) from the third node to the second node, wherein, based on the change to the phase of the third bias signal (e.g., $J_{bb}$), the fifth signal indicates a likelihood, such as P(B), of the third condition. In response to the instance of the second condition, the second node may communicate to the third node a sixth signal (e.g., adjustment signal 444) which is based on the second bias signal. Based on the sixth signal, the third node may adjust an amount of the change applied to the phase of the third bias signal.

In some embodiments, the second node also functions as a parent node of some third node which corresponds to a third condition. In such an embodiment, method 300 may further comprise receiving a third bias signal at the third node, and applying a change to a phase of the second bias signal. Similar to the communicating at 330, the second node may communicate a fifth signal to the third node, wherein, based on the change to the phase of the second bias signal, the fifth signal indicates a likelihood of the second condition. Similar to the receiving at 340 and the communicating at 350, the third node may receive a signal which indicates an instance of the third condition and, in response to the instance of the third condition, may communicate to the second node a sixth signal based on the third bias signal. Based on the sixth signal, the second node may adjust an amount of the change to the phase of the second bias signal.

Figure 5:
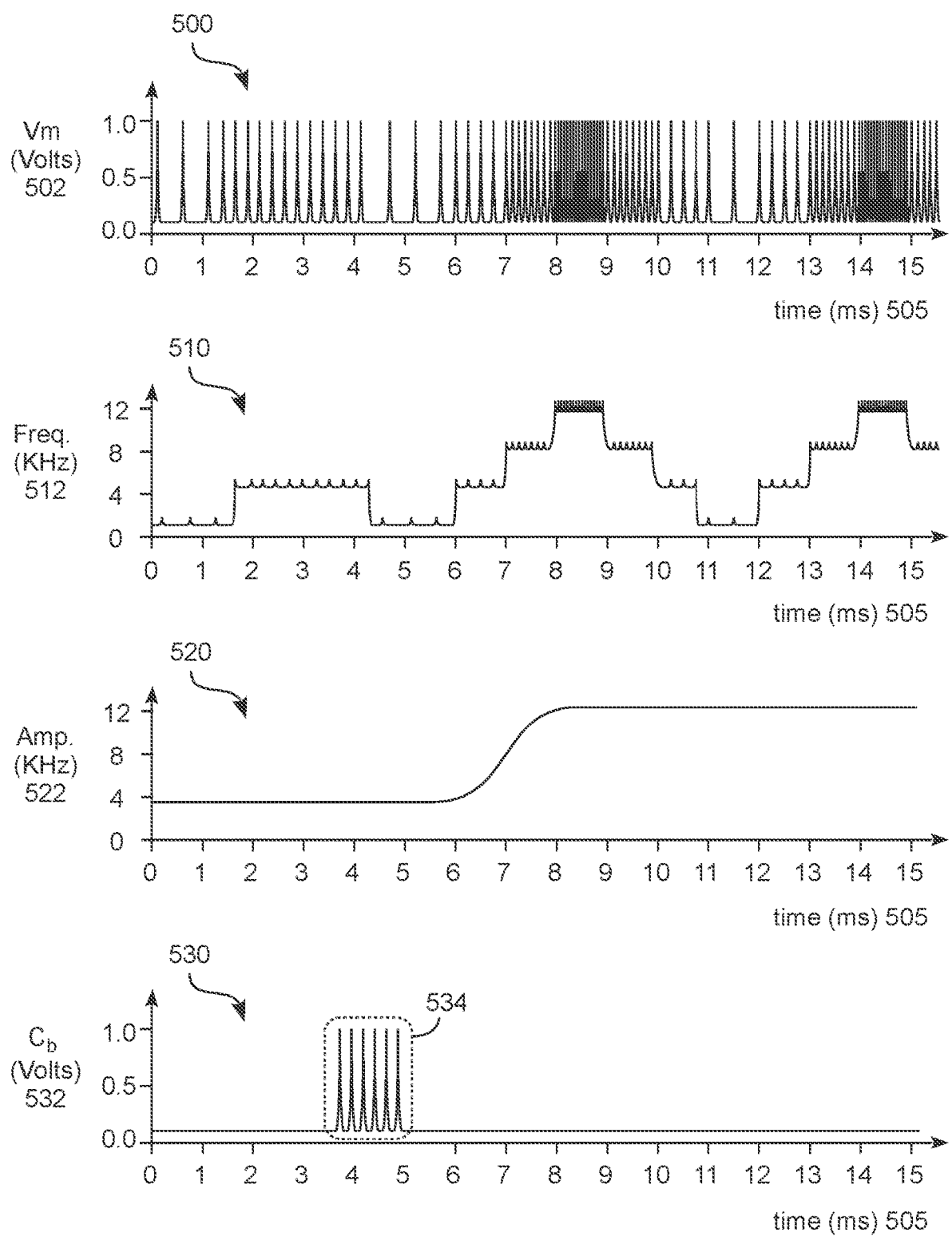
FIG. 5 shows timing diagrams variously illustrating signals generated with a spiking neural network according to an embodiment.

FIG. 5 shows timing diagrams 500, 510, 520, 530 which variously illustrate, each with respect to a time axis 505, a respective signal characteristic during operations to perform a Bayesian inference operation according to an embodiment. The signal characteristics may be determined at one of spiking neural networks 100, 200, 400—e.g., based on respective signals variously communicated with nodes 240, 250. The various scales shown in timing diagrams 500, 510, 520, 530—e.g., for timing, voltages, and frequencies—are merely illustrative of some embodiments, and may vary according to implementation-specific details.

Timing diagram 500 shows spiking by a membrane voltage Vm 502 at a parent node such as one of nodes 210, 240, 416, 418. The same spiking (or otherwise corresponding spiking) may be provided by a likelihood signal which is generated by the parent node based on Vm 502. The spiking may have at least some cyclical component, wherein an amplitude, wavelength and/or other characteristic of the cyclical component indicates a probability of a condition to which the parent node corresponds. For example, as illustrated by timing diagram 510, a frequency 512 of spiking by membrane voltage Vm 502 may exhibit an oscillation component. Frequency 512 may be a moving average of spikes which occur in a given time window.

Timing diagram 520 illustrates an amplitude 522 of oscillation by the frequency 512 (where amplitude 522 is a rate-amplitude of Vm 502). As illustrated by timing diagram 520, amplitude 522 may have a first value (e.g., 4 KHz) during a first period of time which, for example, includes a period between the time 0 and time 6 shown. This first value of amplitude 522 may be based on a corresponding amount of a phase change which is applied to a bias signal at the parent node.

A likelihood signal, based on Vm 502, may be communicated from the patent node to a child node. Subsequently, the child node may detect, based on an instance signal provided thereto, an instance of another condition to which the child node corresponds. In response to such an instance, the child node may communicate to the parent node is to adjust an amount of the phase change which is applied to the bias signal. For example, as shown in timing diagram 530, the child node may communicate a spike pattern 534 of an adjustment signal $C_b$ 532. In response to spike pattern 534, the value of amplitude 522 may change. In the example scenario shown, the value of amplitude 522 increases to a second value (e.g., 13 KHz) after a time of spike pattern 534. This variable value of amplitude 522 may indicate a current probability of a condition to which the patent node corresponds.

Figure 6:
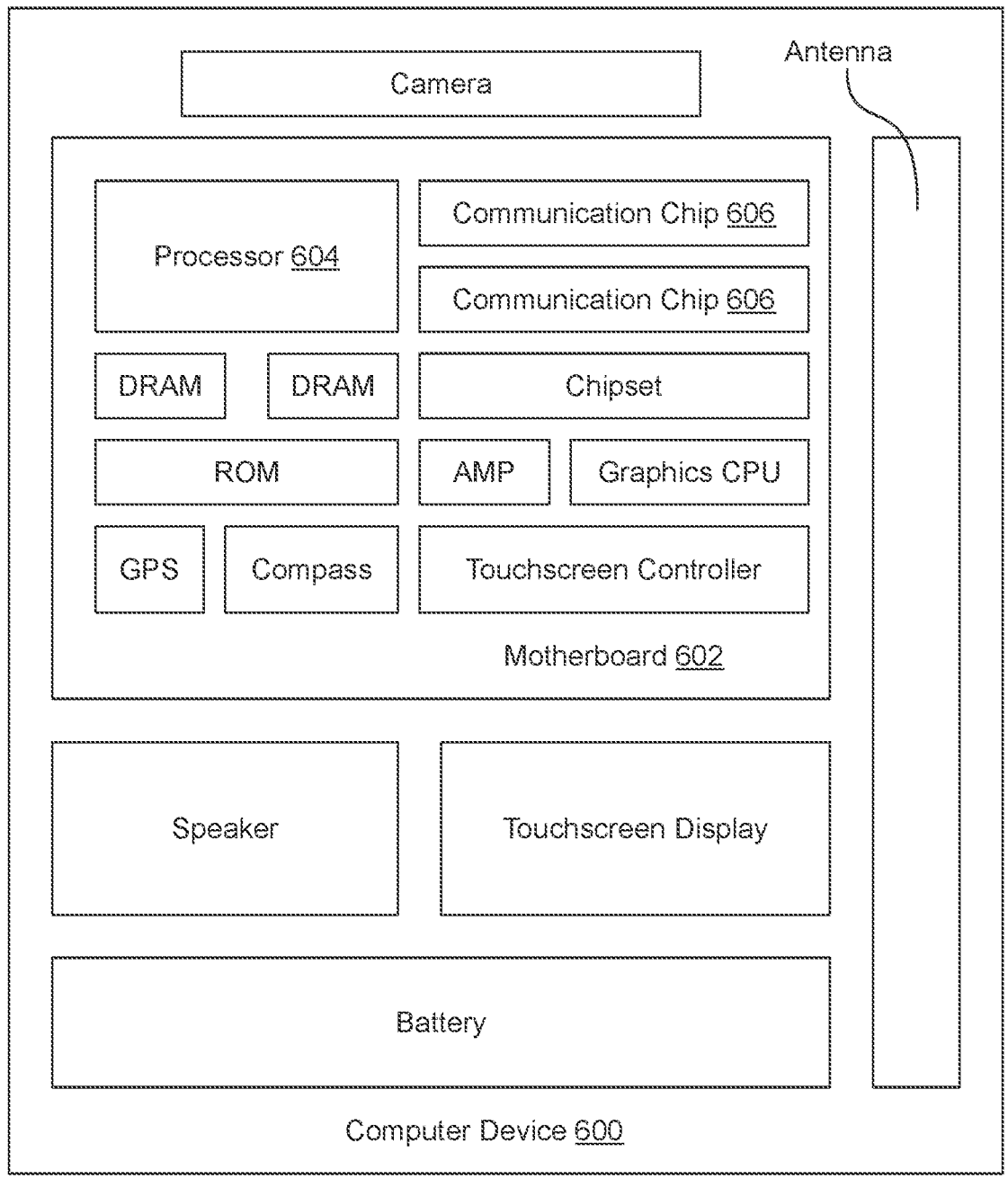
FIG. 6 is a functional block diagram illustrating a computing device in accordance with one embodiment.

FIG. 6 illustrates a computing device 600 in accordance with one embodiment. The computing device 600 houses a board 602. The board 602 may include a number of components, including but not limited to a processor 604 and at least one communication chip 606. The processor 604 is physically and electrically coupled to the board 602. In some implementations the at least one communication chip 606 is also physically and electrically coupled to the board 602. In further implementations, the communication chip 606 is part of the processor 604.

Depending on its applications, computing device 600 may include other components that may or may not be physically and electrically coupled to the board 602. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 606 enables wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

The processor 604 of the computing device 600 includes an integrated circuit die packaged within the processor 604.

The term "processor" may refer to any device or portion of a device that processes electronic data from registers and/or memory to transform that electronic data into other electronic data that may be stored in registers and/or memory. The communication chip 606 also includes an integrated circuit die packaged within the communication chip 606.

In various implementations, the computing device 600 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 600 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 7:
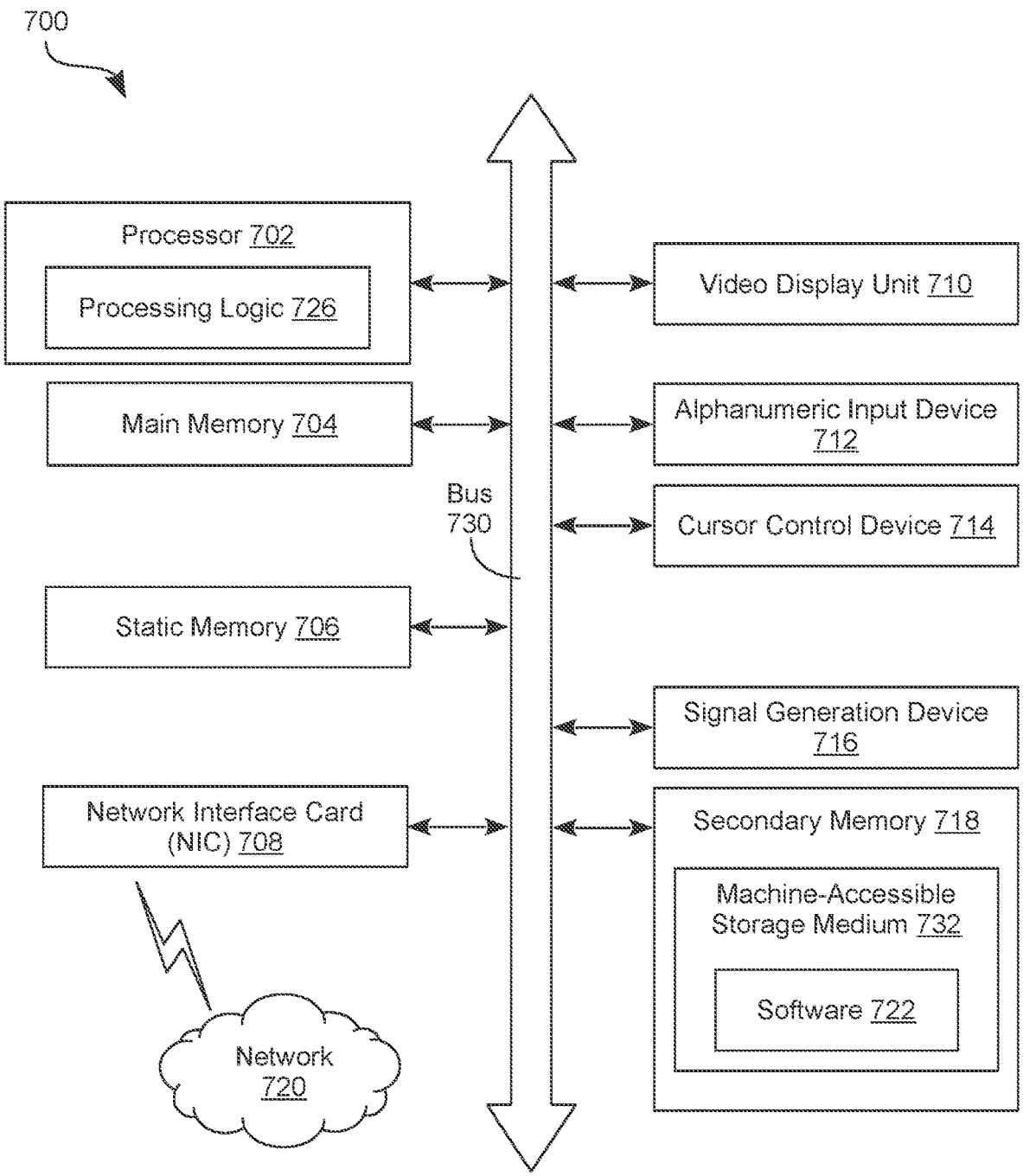
FIG. 7 is a functional block diagram illustrating an exemplary computer system, in accordance with one embodiment.

FIG. 7 illustrates a diagrammatic representation of a machine in the exemplary form of a computer system 700 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations described herein.

The computer system 700 may further include a network interface device 708. The computer system 700 also may include a video display unit 710 (e.g., a liquid crystal display (LCD), a light emitting diode display (LED), or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-accessible storage medium (or more specifically a computer-readable storage medium) 732 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface device 708.

While the machine-accessible storage medium 732 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Example 1 is a computer device for generating a Bayesian inference with a spiking neural network, the computer device comprising circuitry to receive a first bias signal at a first node of the spiking neural network, wherein the first node corresponds to a first condition of a Bayesian network, receive a second bias signal at a second node of the spiking neural network, wherein the second node corresponds to a second condition of the Bayesian network, and apply a change to a phase of the first bias signal. The circuitry is further to communicate a third signal from the first node to the second node in response to the change to the phase of the first bias signal, wherein the third signal indicates a likelihood of the first condition, receive at the second node a signal which indicates an instance of the second condition, in response to the instance of the second condition, communicate, from the second node to the first node, a fourth signal based on the second bias signal, and based on the fourth signal, adjust an amount of the change to the phase of the first bias signal.

In Example 2, the subject matter of Example 1 optionally includes wherein, based on the change to the phase of the first bias signal, a rate of spiking of the third signal varies with time, wherein an amplitude of variation by the rate of spiking of the third signal indicates the likelihood of the first condition.

In Example 3, the subject matter of any one or more of Examples 1 and 2 optionally includes wherein the fourth signal is further based on a conditional probability of the second condition given the first condition.

In Example 4, the subject matter of Example 3 optionally includes wherein the third signal is communicated via a synapse coupled between the first node and the second node, wherein a weight assigned to the synapse indicates the conditional probability of the second condition given the first condition.

In Example 5, the subject matter of Example 3 optionally includes wherein the fourth signal is based on a ratio of the conditional probability to a probability of the second condition.

In Example 6, the subject matter of any one or more of Examples 1 and 2 optionally includes the computer device further comprising circuitry to apply another change to a phase of the second bias signal, wherein the fourth signal is further based on the change to the phase of second bias signal.

In Example 7, the subject matter of any one or more of Examples 1 and 2 optionally includes the computer device further comprising circuitry to receive a third bias signal at a third node of the spiking neural network which corresponds to a third condition of the Bayesian network, communicate the third signal from the first node to the third node, receive at the third node a signal which indicates an instance of the third condition, in response to the instance of the third condition, communicate, from the third node to the first node, a fifth signal based on the third bias signal, and based on the fifth signal, further adjust the amount of the change to the phase of the first bias signal.

In Example 8, the subject matter of Example 7 optionally includes wherein the circuitry is to adjust the amount of the change to the phase of the first bias signal based on the fifth signal concurrent with an adjustment to the change to the phase of the first bias signal based on the fourth signal.

In Example 9, the subject matter of any one or more of Examples 1 and 2 optionally includes circuitry to receive a third bias signal at a third nose of the spiking neural network which corresponds to a third condition of the Bayesian network, apply a change to a phase of the third bias signal, communicate a fifth signal from the third node to the second node, wherein, based on the change to the phase of the third bias signal, the fifth signal indicates a likelihood of the third condition, in response to the instance of the second condition, communicate, from the second node to the third nose, a sixth signal based on the second bias signal, and based on the sixth signal, adjust an amount of the change to the phase of the third bias signal.

In Example 10, the subject matter of any one or more of Examples 1 and 2 optionally includes the computer device further comprising circuitry to receive a third bias signal at a third node of the spiking neural network which corresponds to a third condition of the Bayesian network, apply a change to a phase of the second bias signal, communicate a fifth signal from the second node to the third node, wherein, based on the change to the phase of the second bias signal, the fifth signal indicates a likelihood of the second condition, receive at the third node a signal which indicates an instance of the third condition, in response to the instance of the third condition, communicate, from the third node to the second node, a sixth signal based on the third bias signal, and based on the sixth signal, adjust an amount of the change to the phase of the second bias signal.

In Example 11, the subject matter of any one or more of Examples 1 and 2 optionally includes the computer device further comprising circuitry to select one condition of the Bayesian network over one or more other conditions of the Bayesian network based on the adjusted amount of the change.

Example 12 is at least one non-volatile machine readable medium including instructions that, when executed by a machine, cause the machine to perform operations for generating a Bayesian inference with a spiking neural network, the operations comprising receiving a first bias signal at a first node of the spiking neural network wherein the first node corresponds to a first condition of a Bayesian network, receiving a second bias signal at a second node of the spiking neural network, wherein the second node corresponds to a second condition of the Bayesian network, applying a change to a phase of the first bias signal, and communicating a third signal from the first node to the second node in response to the change to the phase of the first bias signal, wherein the third signal indicates a likelihood of the first condition. The operations further comprise receiving at the second node a signal which indicates an instance of the second condition, in response to the instance of the second condition, communicating, from the second node to the first node, a fourth signal based on the second bias signal, and based on the fourth signal, adjusting an amount of the change to the phase of the first bias signal.

In Example 13, the subject matter of Example 12 optionally includes wherein, based on the change to the phase of the first bias signal, a rate of spiking of the third signal varies with time, wherein an amplitude of variation by the rate of spiking of the third signal indicates the likelihood of the first condition.

In Example 14, the subject matter of any one or more of Examples 12 and 13 optionally includes wherein the fourth signal is further based on a conditional probability of the second condition given the first condition.

In Example 15, the subject matter of Example 14 optionally includes wherein the third signal is communicated via a synapse coupled between the first node and the second node, wherein a weight assigned to the synapse indicates the conditional probability of the second condition given the first condition.

In Example 16, the subject matter of Example 14 optionally includes wherein the fourth signal is based on a ratio of the conditional probability to a probability of the second condition.

In Example 17, the subject matter of any one or more of Examples 12 and 13 optionally includes the operations further comprising applying another change to a phase of the second bias signal, wherein the fourth signal is further based on the change to the phase of second bias signal.

In Example 18, the subject matter of any one or more of Examples 12 and 13 optionally includes the operations further comprising receiving a third bias signal at a third node of the spiking neural network which corresponds to a third condition of the Bayesian network, communicating the third signal from the first node to the third node, receiving at the third node a signal which indicates an instance of the third condition, in response to the instance of the third condition, communicating, from the third node to the first node, a fifth signal based on the third bias signal, and based on the fifth signal, further adjusting the amount of the change to the phase of the first bias signal.

In Example 19, the subject matter of Example 18 optionally includes wherein adjusting the amount of the change to the phase of the first bias signal based on the fifth signal is concurrent with an adjustment to the change to the phase of the first bias signal based on the fourth signal.

In Example 20, the subject matter of any one or more of Examples 12 and 13 optionally includes the operations further comprising receiving a third bias signal at a third node of the spiking neural network which corresponds to a third condition of the Bayesian network, applying a change to a phase of the third bias signal, communicating a fifth signal from the third node to the second node, wherein, based on the change to the phase of the third bias signal, the fifth signal indicates a likelihood of the third condition, in response to the instance of the second condition, communicating, from the second node to the third node, a sixth signal based on the second bias signal, and based on the sixth signal, adjusting an amount of the change to the phase of the third bias signal.

In Example 21, the subject matter of any one or more of Examples 12 and 13 optionally includes the operations further comprising receiving a third bias signal at a third node of the spiking neural network which corresponds to a third condition of the Bayesian network, applying a change to a phase of the second bias signal, communicating a fifth signal from the second node to the third node, wherein, based on the change to the phase of the second bias signal, the fifth signal indicates a likelihood of the second condition, receiving at the third node a signal which indicates an instance of the third condition, in response to the instance of the third condition, communicating, from the third node to the second node, a sixth signal based on the third bias signal, and based on the sixth signal, adjusting an amount of the change to the phase of the second bias signal.

In Example 22, the subject matter of any one or more of Examples 12 and 13 optionally includes the operations further comprising selecting one condition of the Bayesian network over one or more other conditions of the Bayesian network, the selecting based on the adjusted amount of the change.

Example 23 is a method for generating a Bayesian inference with a spiking neural network, the method comprising receiving a first bias signal at a first node of the spiking neural network, wherein the first node corresponds to a first condition of a Bayesian network, receiving a second bias signal at a second node of the spiking neural network, wherein the second node corresponds to a second condition of the Bayesian network, applying a change to a phase of the first bias signal, and communicating a third signal from the first node to the second node in response to the change to the phase of the first bias signal, wherein the third signal indicates a likelihood of the first condition. The method further comprises receiving at the second node a signal which indicates an instance of the second condition, in response to the instance of the second condition, communicating, from the second node to the first node, a fourth signal based on the second bias signal, and based on the fourth signal, adjusting an amount of the change to the phase of the first bias signal.

In Example 24, the subject matter of Example 23 optionally includes wherein, based on the change to the phase of the first bias signal, a rate of spiking of the third signal varies with time, wherein an amplitude of variation by the rate of spiking of the third signal indicates the likelihood of the first condition.

In Example 25, the subject matter of any one or more of Examples 23 and 24 optionally includes wherein the fourth signal is further based on a conditional probability of the second condition given the first condition.

In Example 26, the subject matter of Example 25 optionally includes wherein the third signal is communicated via a synapse coupled between the first node and the second node, wherein a weight assigned to the synapse indicates the conditional probability of the second condition given the first condition.

In Example 27, the subject matter of Example 25 optionally includes wherein the fourth signal is based on a ratio of the conditional probability to a probability of the second condition.

In Example 28, the subject matter of any one or more of Examples 23 and 24 optionally includes the method further comprising applying another change to a phase of the second bias signal, wherein the fourth signal is further based on the change to the phase of second bias signal.

In Example 29, the subject matter of any one or more of Examples 23 and 24 optionally includes the method further comprising receiving a third bias signal at a third node of the spiking neural network which corresponds to a third condition of the Bayesian network, communicating the third signal from the first node to the third node, receiving at the third node a signal which indicates an instance of the third condition, in response to the instance of the third condition, communicating, from the third node to the first node, a fifth signal based on the third bias signal, and based on the fifth signal, further adjusting the amount of the change to the phase of the first bias signal.

In Example 30, the subject matter of Example 29 optionally includes wherein adjusting the amount of the change to the phase of the first bias signal based on the fifth signal is concurrent with an adjustment to the change to the phase of the first bias signal based on the fourth signal.

In Example 31, the subject matter of any one or more of Examples 23 and 24 optionally includes the method further comprising receiving a third bias signal at a third node of the spiking neural network which corresponds to a third condition of the Bayesian network, applying a change to a phase of the third bias signal, communicating a fifth signal from the third node to the second node, wherein, based on the change to the phase of the third bias signal, the fifth signal indicates a likelihood of the third condition, in response to the instance of the second condition, communicating, from the second node to the third node, a sixth signal based on the second bias signal, and based on the sixth signal, adjusting an amount of the change to the phase of the third bias signal.

In Example 32, the subject matter of any one or more of Examples 23 and 24 optionally includes the method further comprising receiving a third bias signal at a third node of the spiking neural network which corresponds to a third condition of the Bayesian network, applying a change to a phase of the second bias signal, communicating a fifth signal from the second node to the third node, wherein, based on the change to the phase of the second bias signal, the fifth signal indicates a likelihood of the second condition, receiving at the third node a signal which indicates an instance of the third condition, in response to the instance of the third condition, communicating, from the third node to the second node, a sixth signal based on the third bias signal, and based on the sixth signal, adjusting an amount of the change to the phase of the second bias signal.

In Example 33, the subject matter of any one or more of Examples 23 and 24 optionally includes the method further comprising selecting one condition of the Bayesian network over one or more other conditions of the Bayesian network, the selecting based on the adjusted amount of the change.

Techniques and architectures for providing functionality of a spiking neural network are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A computer device for generating a Bayesian inference with a spiking neural network, the computer device comprising circuitry to:
   receive a first bias signal at a first node of the spiking neural network, wherein the first node corresponds to a first condition of a Bayesian network;
   receive a second bias signal at a second node of the spiking neural network, wherein the second node corresponds to a second condition of the Bayesian network;
   apply a change to a phase of the first bias signal;
   communicate a third signal from the first node to the second node in response to the change to the phase of the first bias signal, wherein the third signal indicates a likelihood of the first condition;
   receive at the second node a signal which indicates an instance of the second condition;
   in response to the instance of the second condition, communicate, from the second node to the first node, a fourth signal based on the second bias signal; and
   based on the fourth signal, adjust an amount of the change to the phase of the first bias signal.

2. The computer device of claim 1, wherein, based on the change to the phase of the first bias signal, a rate of spiking of the third signal varies with time, wherein an amplitude of variation by the rate of spiking of the third signal indicates the likelihood of the first condition.

3. The computer device of claim 1, wherein the fourth signal is further based on a conditional probability of the second condition given the first condition.

4. The computer device of claim 3, wherein the third signal is communicated via a synapse coupled between the first node and the second node, wherein a weight assigned to the synapse indicates the conditional probability of the second condition given the first condition.

5. The computer device of claim 3, wherein the fourth signal is based on a ratio of the conditional probability to a probability of the second condition.

6. The computer device of claim 1, further comprising circuitry to apply another change to a phase of the second bias signal, wherein the fourth signal is further based on the change to the phase of second bias signal.

7. The computer device of claim 1, further comprising circuitry to:
   receive a third bias signal at a third node of the spiking neural network which corresponds to a third condition of the Bayesian network;
   communicate the third signal from the first node to the third node;
   receive at the third node a signal which indicates an instance of the third condition;
   in response to the instance of the third condition, communicate, from the third node to the first node, a fifth signal based on the third bias signal; and
   based on the fifth signal, further adjust the amount of the change to the phase of the first bias signal.

8. The computer device of claim 7, wherein the circuitry is to adjust the amount of the change to the phase of the first bias signal based on the fifth signal concurrent with an adjustment to the change to the phase of the first bias signal based on the fourth signal.

9. The computer device of claim 1, further comprising circuitry to:
   receive a third bias signal at a third node of the spiking neural network which corresponds to a third condition of the Bayesian network;
   apply a change to a phase of the third bias signal;
   communicate a fifth signal from the third node to the second node, wherein, based on the change to the phase of the third bias signal, the fifth signal indicates a likelihood of the third condition;
   in response to the instance of the second condition, communicate, from the second node to the third node, a sixth signal based on the second bias signal; and
   based on the sixth signal, adjust an amount of the change to the phase of the third bias signal.

10. The computer device of claim 1, further comprising circuitry to select one condition of the Bayesian network over one or more other conditions of the Bayesian network based on the adjusted amount of the change.

11. At least one non-transitory machine readable medium including instructions that, when executed by a machine, cause the machine to perform operations for generating a Bayesian inference with a spiking neural network, the operations comprising:
   receiving a first bias signal at a first node of the spiking neural network wherein the first node corresponds to a first condition of a Bayesian network;
   receiving a second bias signal at a second node of the spiking neural network, wherein the second node corresponds to a second condition of the Bayesian network;
   applying a change to a phase of the first bias signal;
   communicating a third signal from the first node to the second node in response to the change to the phase of the first bias signal, wherein the third signal indicates a likelihood of the first condition;
   receiving at the second node a signal which indicates an instance of the second condition;
   in response to the instance of the second condition, communicating, from the second node to the first node, a fourth signal based on the second bias signal; and
   based on the fourth signal, adjusting an amount of the change to the phase of the first bias signal.

12. The at least one non-transitory machine readable medium of claim 11, wherein, based on the change to the phase of the first bias signal, a rate of spiking of the third signal varies with time, wherein an amplitude of variation by the rate of spiking of the third signal indicates the likelihood of the first condition.

13. The at least one non-transitory machine readable medium of claim 11, wherein the fourth signal is further based on a conditional probability of the second condition given the first condition.

14. The at least one non-transitory machine readable medium of claim 13, wherein the third signal is communicated via a synapse coupled between the first node and the second node, wherein a weight assigned to the synapse indicates the conditional probability of the second condition given the first condition.

15. The at least one non-transitory machine readable medium of claim 13, wherein the fourth signal is based on a ratio of the conditional probability to a probability of the second condition.

16. The at least one non-transitory machine readable medium of claim 11, the operations further comprising applying another change to a phase of the second bias signal, wherein the fourth signal is further based on the change to the phase of second bias signal.

17. The at least one non-transitory machine readable medium of claim 11, the operations further comprising:
receiving a third bias signal at a third node of the spiking neural network which corresponds to a third condition of the Bayesian network;
communicating the third signal from the first node to the third node;
receiving at the third node a signal which indicates an instance of the third condition;
in response to the instance of the third condition, communicating, from the third node to the first node, a fifth signal based on the third bias signal; and
based on the fifth signal, further adjusting the amount of the change to the phase of the first bias signal.

18. A method for generating a Bayesian inference with a spiking neural network, the method comprising:
receiving a first bias signal at a first node of the spiking neural network, wherein the first node corresponds to a first condition of a Bayesian network;
receiving a second bias signal at a second node of the spiking neural network, wherein the second node corresponds to a second condition of the Bayesian network;
applying a change to a phase of the first bias signal;
communicating a third signal from the first node to the second node in response to the change to the phase of the first bias signal, wherein the third signal indicates a likelihood of the first condition;
receiving at the second node a signal which indicates an instance of the second condition;
in response to the instance of the second condition, communicating, from the second node to the first node, a fourth signal based on the second bias signal; and
based on the fourth signal, adjusting an amount of the change to the phase of the first bias signal.

19. The method of claim 18, wherein, based on the change to the phase of the first bias signal, a rate of spiking of the third signal varies with time, wherein an amplitude of variation by the rate of spiking of the third signal indicates the likelihood of the first condition.

20. The method of claim 18, wherein the fourth signal is further based on a conditional probability of the second condition given the first condition.

* * * * *